(12) United States Patent
Ogura et al.

(10) Patent No.: US 6,356,177 B1
(45) Date of Patent: Mar. 12, 2002

(54) MAGNETIC CIRCUIT

(75) Inventors: Yumi Ogura; Yoshimi Enoki; Hideyuki Yamane; Shigeki Wagata, all of Hiroshima; Masato Enokizono, Oita, all of (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 09/599,728

(22) Filed: Jun. 23, 2000

(30) Foreign Application Priority Data

Jun. 25, 1999 (JP) ............................................ 11-179666

(51) Int. Cl.[7] .............................................. H01F 7/02
(52) U.S. Cl. ........................................ 335/306; 335/207
(58) Field of Search ........................ 335/302–6, 205–7

(56) References Cited

U.S. PATENT DOCUMENTS 5,097,625 A * 3/1992 Kaneko et al. ................. 47/56
5,781,005 A * 7/1998 Vig et al. .................. 324/207.2
6,056,872 A * 5/2000 Glass .......................... 210/32

FOREIGN PATENT DOCUMENTS

JP          362128014 A  * 11/1985

* cited by examiner

Primary Examiner—Lincoln Donovan
(74) Attorney, Agent, or Firm—Wenderoth, Lind & Ponack, L.L.P.

(57) ABSTRACT

A magnetic circuit includes a multi-pole magnet mounted on a predetermined surface of a yoke and having magnetic poles formed in a direction perpendicular to the predetermined surface of the yoke. The multi-pole magnet is separated into two pieces, and a single-pole magnet is interposed between the two pieces of the multi-pole magnet. Magnetic poles of the single-pole magnet are formed in a direction different from the direction in which those of the multi-pole magnet are formed.

5 Claims, 13 Drawing Sheets

MAGNETIC CIRCUIT

BACKGROUND OF THE INVENTION

1. Field of the Invention

The present invention relates to a magnetic circuit that constitutes a repulsive magneto-spring and is mounted on a suspension unit or the like.

2. Description of the Related Art

Various types of damping materials, dampers, and other control methods have been proposed to prevent vibration and noise that occur in machines and structures built from materials with low internal damping properties, which are required for their strength and rigidity.

Normally, springs and damping materials, such as metal springs, rubber, air springs, viscoelastic materials, and dampers, are combined to optimize vibration isolating properties. However, this combination often exhibits opposing characteristics, as in the relationship between dynamic magnification and loss factor. For that reason, many studies are being conducted on controlling vibration using passive vibration isolators including dynamic dampers, or quasi-active or active control systems. There is a demand for dampers which can cope with a characteristic change of an object for which vibration isolation is intended, or which is not subject to deterioration with age or influenced by the environment, such as temperatures, oils, ozone or the like.

In recent years, accompanying the practical use of permanent magnets that have a high coercive force and high residual magnetic flux density, research is flourishing in areas such as mechanical structures and magnetic systems that utilize magnetic levitation, magnetic bearings, dampers employing a magnetic fluid, etc., which use magnetic force and magnetic fluidity to control vibration. In particular, magnetic dampers in which eddy currents caused by electromagnetic induction and magnetic damping caused by the effects of magnetic flux are utilized and are useful as an attenuating means, and the practical use thereof is expanding.

The construction of an efficient magnetic circuit wherein a magneto-spring is constituted by repulsive permanent magnets is still open to further research. In the present, although the repulsive force of the magneto-spring is enlarged by increasing the size (thickness, opposing area and the like) of the magnetic circuit, there arises a problem in that the weight or cost of the magneto-spring is increased.

SUMMARY OF THE INVENTION

The present invention has been developed to overcome the above-described disadvantages.

It is accordingly an objective of the present invention to provide a relatively inexpensive magnetic circuit that constitutes a repulsive magneto-spring having an increased repulsive force.

In accomplishing the above and other objectives, the magnetic circuit according to the present invention includes a yoke and a multi-pole magnet mounted on a predetermined surface of the yoke. The multi-pole magnet has magnetic poles formed in a direction perpendicular to the predetermined surface of the yoke. The multi-pole magnet is separated into two pieces. The magnetic circuit also includes a single-pole magnet interposed between the two pieces of the multi-pole magnet. The single-pole magnet has magnetic poles formed in a direction different from the direction in which the magnetic poles of the multi-pole magnet are formed. With this arrangement, the magnetic flux of the multi-pole magnet is controlled by the magnetic flux of the single-pole magnet, making it possible to provide an inexpensive magnetic circuit of a simple construction that can produce a large repulsive force.

Advantageously, the single-pole magnet is placed on a projection formed with the yoke on the predetermined surface thereof or on a spacer mounted on the predetermined surface of the yoke, and the two pieces of the multi-pole magnet are located on respective sides of the single-pole magnet. This arrangement can reduce the size of the single-pole magnet and provides an inexpensive magnetic circuit.

The two pieces of the multi-pole magnet adjoin the single-pole magnet with like magnetic poles opposed to each other on a side of the multi-pole magnet remote from the predetermined surface of the yoke, making it possible to further increase the repulsive force.

It is preferred that a two-pole magnet be used as the multi-pole magnet. With the use of the two-pole magnet, an increased repulsive force can be produced by a relatively inexpensive and simple magnetic circuit.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

This application is based on application No. 11-179666 filed Jun. 25, 1999 in Japan, the content of which is incorporated hereinto by reference.

When a motion is imparted to repulsive permanent magnets having like magnetic poles opposed to each other, the spring constant thereof varies depending on the loaded mass or input. Also, the repulsive permanent magnets support physical objects with no actual physical contact. The magneto-spring characteristics that realize vibration isolation in all directions are discussed hereinafter.

In a magneto-spring, a pair of permanent magnets such as, for example, rare-earth magnets (Nd—Fe—B) are faced to repel each other. The magneto-spring provides a magnetic braking force caused by repulsive forces or attractive forces created under relative motion or a damping force created by electromagnetic induction.

Figure 1:
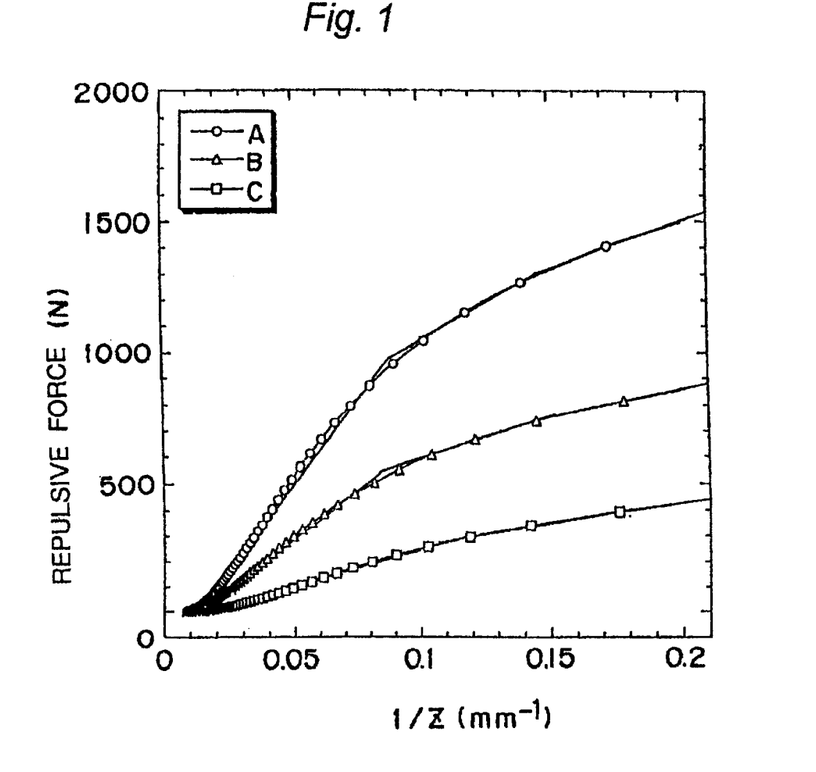
FIG. 1 is a graph depicting a relationship between the distance between two opposing magnets and the static repulsive force when various magnets have been moved in the direction perpendicular to their major surfaces.

FIG. 1 shows a relationship between the distance between the magnets (z) and the static repulsive force (F), when magnets of different size and mass are put in motion in the direction perpendicular to their surfaces. In FIG. 1, A indicates magnets of s=75×75 mm2 and h=20 mm, B indicates magnets of s=75×75 mm2 and h=10 mm, and C indicates magnets of s=50×50 mm2 and h=10 mm.

When the load-deflection characteristic of a magneto-spring system is small enough to ignore the frictional loss, it is reversible, and the repulsive force Fan acting between the magnets has the following relationship:

$$F_{mg} = \frac{k_m}{z} + F_0 \quad (1)$$

In this equation, $k_m$ is the spring constant, z is the distance between the magnets, and $F_o$ is the initial value.

In rare earth magnets, the internal magnetic moment is not easily affected by a magnetic field, and the strength of magnetization on a demagnetization curve barely fluctuates, and nearly completely maintains a saturation magnetization strength. For that reason, when the magnetic charge is evenly dispersed at the end surfaces of magnets, a hypothesized charge model is used in calculating the repulsive force acting between the magnets.

Figure 2:
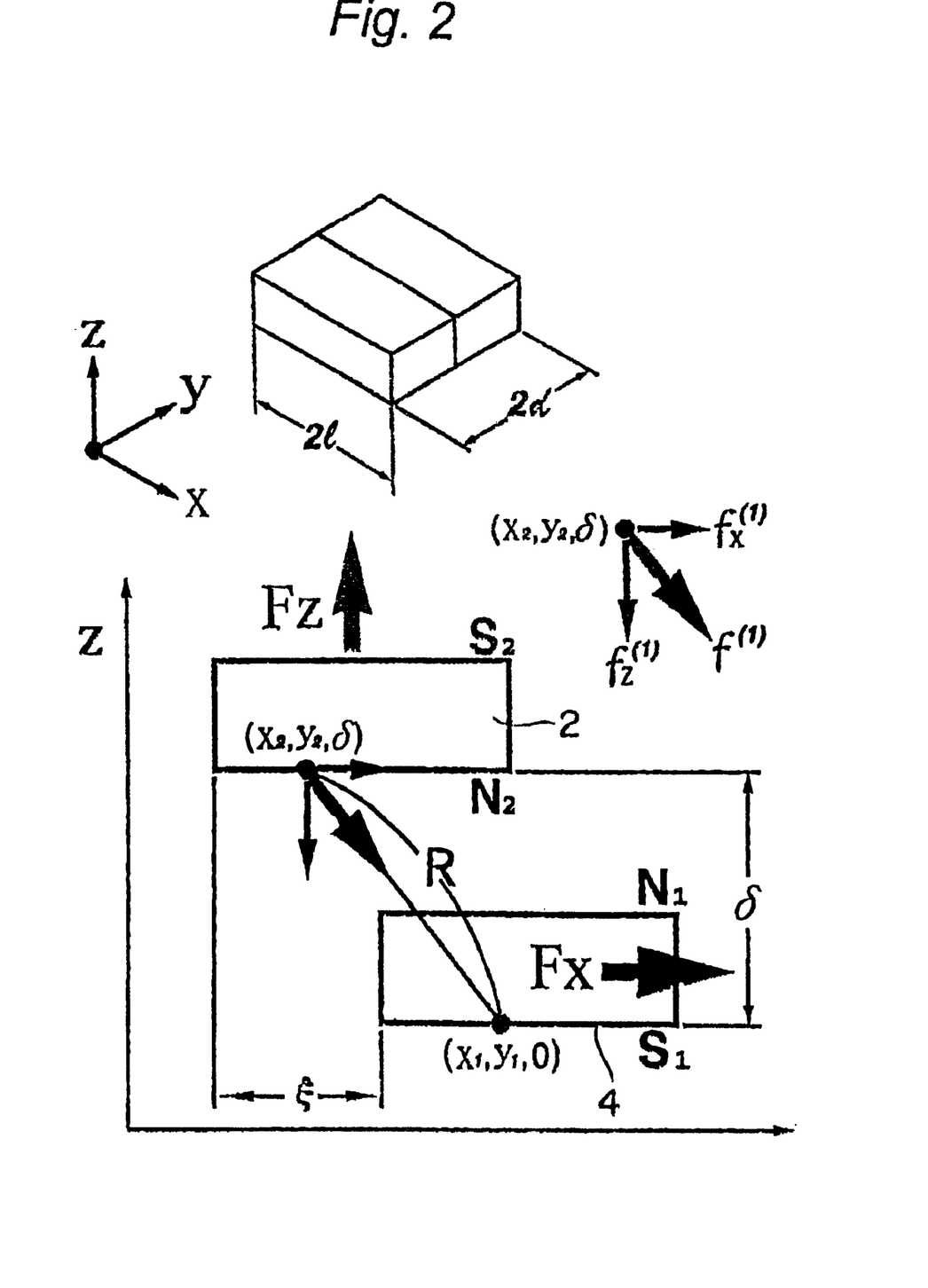
FIG. 2 is a schematic view of an analytical model for use in analyzing the repulsive force and the attractive force of the two permanent magnets with like magnetic poles opposed to each other.

As shown in FIG. 2, the attractive force $f^{(1)}$ that acts upon point (x2, y2, δ) on a magnet surface N2 and upon point (x1, y1, 0) on a magnet surface S1 is shown below:

$$f^{(1)} dx_1 dy_1 dx_2 dy_2 = \frac{q^2}{R^2} dx_1 dy_1 dx_2 dy_2 \quad (2)$$

where $qdx_1 dy_1$ and $qdx_2 dy_2$ represent the magnetic charge of minute areas $dx_1 dy_1$ and $dx_2 dy_2$, respectively, and R is derived by the following equation:

$$R^2 = (x_2-x_1)^2 + (y_2-y_1)^2 + \delta^2 \quad (3)$$

The x component and the z component of $f^{(1)}$ are derived from the following equations:

$$f_x^{(1)} = f^{(1)} \frac{\sqrt{(x_2 - x_1)^2 + (y_2 - y_1)^2}}{R} \quad (4)$$

$$f_z^{(1)} = f^{(1)} \frac{\delta}{R} \quad (5)$$

In the same manner, if $f^{(2)}$ is the repulsive force acting between N1 and N2, and $f^{(3)}$ is the repulsive force acting between S1 and S2, loads Fz and Fx are expressed by the following equation:

$$F_\alpha = \quad (6)$$

$$\int_{-d}^{d} \int_{-d}^{d} \int_{-(\zeta+l)}^{-(\zeta-l)} \int_{-l}^{l} [-2f_\alpha^{(1)} + f_\alpha^{(2)} + f_\alpha^{(3)}] dx_1 dx_2 dy_1 dy_2 (\alpha = x, z)$$

In this equation, (l) and (d) indicate the size of the magnets and ξ is the amount by which the two magnets are offset from each other, provided that the origin for calculation is located at the center point of each magnet.

By multiplying correction factors, the results are in good agreement with experimental data within a 5% margin of error.

As discussed above, the repulsive force acting between the two magnets is calculated by:

$$F_{mg} = \frac{k_m}{z} + F_0 \quad (7)$$

Figure 3:
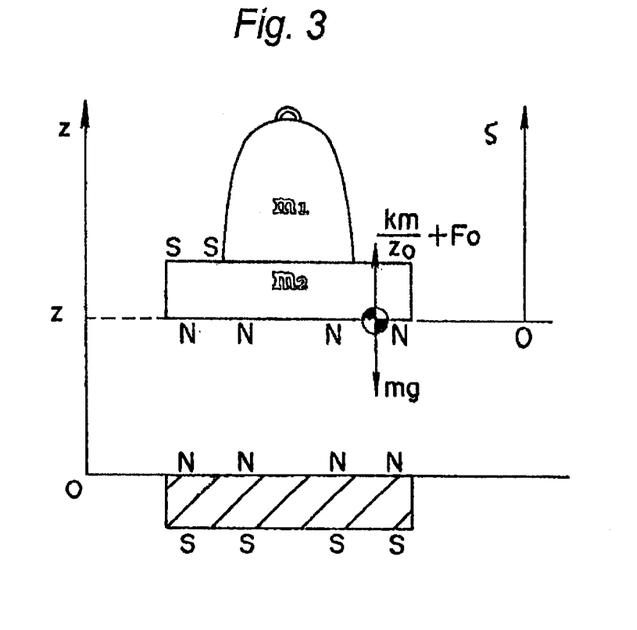
FIG. 3 is a schematic view of a vibration model having two permanent magnets with like magnetic poles opposed to each other, wherein an upper magnet together with a weight placed thereon is allowed to oscillate slightly around a balanced point.

Therefore, in the arrangement of FIG. 3, the equation of motion when a weight is placed on the upper magnet is as follows:

$$m\ddot{z}+c\dot{z}-(k_m z^{-1}+F_0)+mg=F(t) \tag{8}$$

where (m) is the mass of the weight ($m_1$) plus the upper magnet ($m_2$) and (c) is a damping coefficient created by a housing or the like. The second term is a damping term. The third term is a gravity term, and F(t) is an external force. When a balance point of the magnet with the weight placed thereon is $z_0$, $$-(k_m z_0^{-1}+F_0)+mg=0 \tag{9}$$

Therefore, when the balance point is the origin, the equation of motion related to the amount of deflection ξ is as follows:

$$m\Lambda+c\dot{\zeta}+k'_m\zeta=F(t) \tag{10}$$

where $$\zeta=z-z_0 \tag{11}$$

When $\zeta/z_0 \ll 1$, approximated as follows:

$$k_m z^{-1} \approx k_m z_0^{-1}(1-\zeta)=k_m z_0^{-1}-k'_m\zeta \tag{12}$$

$$\frac{k_m}{z} \approx \frac{k_m}{z_0}\left(1-\frac{\zeta}{z_0}\right)=\frac{k_m}{z_0}-k'_m\zeta \tag{13}$$

$$k'_m = \frac{k_m}{z_0^2} = (mg-F_0)^2 k_m^{-1} \tag{14}$$

Here, the external force is calculated as follows, when forced to vibrate at angular frequency ω:

$$F(t)=Fe^{j\omega t} \tag{15}$$

At this time, when $$\zeta=Ae^{j\omega t} \tag{16}$$

the amplitude A is given by the following equation:

$$A = \frac{F_0 \cdot e^{j(\omega t-\phi)}}{k'_m\sqrt{\left\{1-\left(\frac{\omega}{\omega_0}\right)^2\right\}^2 + \left(2\gamma\frac{\omega}{\omega_0}\right)^2}} \tag{17}$$

In this equation, $$\gamma=c/2\sqrt{mk'_m} \tag{18}$$

is the damping ratio. φ is the phase angle expressed by the following equation:

$$\tan\phi = \frac{c\omega}{k'_m - m\omega^2} \tag{19}$$

When the natural frequency is $f_m$, $f_m$ is given by the following equation:

$$f_m = \frac{1}{2\pi}\sqrt{\frac{(mg-F_0)^2}{mk_m}} \tag{20}$$

The relationship between the natural frequency and the spring constant is non-linear and is the reverse of the relationship of metal springs. If an optimum load-deflection characteristic curve is set by adjusting the setting position of the operation point and the magnetic circuit, the resonance frequency can be nearly completely fixed, irrespective of the loaded mass.

When Approximation (13) is considered up to a term of the second degree, Equation (10) is rewritten as follows:

$$m\ddot{\zeta}+c\dot{\zeta}+a\zeta-b\zeta^2=F(t) \tag{21}$$

$$a=(mg-F_0)^2/k_m \quad b=(mg-F_0)^3/k_m^2 \tag{22}$$

In a vibration region with a small amplitude, a constant repulsive force (b $\zeta^2$) is continuously applied to a periodic external force to attenuate it. That is, by adjusting the locus of motion of the permanent magnets to control the spring constant, forced vibration is attenuated by the loaded mass, while being limited by the input.

The magnetic flux density 'B' is determined by the spontaneous magnetization and the effective magnetic field (diamagnetic field+external magnetic field), and is expressed by the following equation:

$$B=4\pi I-Hm+Hex \text{(CGS unit)} \tag{23}$$

The value (4πI) is a magnetic flux produced by the spontaneous magnetization I. The magnetic flux Hm indicates the diamagnetic field of the force by which the magnet weakens itself (self-demagnetization), and Hex is the external magnetic field that arises when magnetic poles oppose one another. As a countermeasure against self-demagnetization, multi-polarization is effective to reduce Hm by creating a sequential (quasi) magnetic field with the neighboring magnets. However, if the gradient of the magnetic line of force is small, compared to the tangential vector at the boundary surface of a magnetic body, the magnetic line of force will not extend outward. In other words, if the number of poles is increased to decrease the En, the magnetic line of force at a central portion hardly extends outward. Moreover, the magnetic flux density at the edges is reduced, weakening the repulsive force. That is, the strength of the repulsive force is determined by the area of the opposing surfaces, the number of poles, and the distance between the magnets that is normally used.

FIGS. 4A to 4E depict various permanent magnets having an area of 75×75 mm² and a thickness of 20 mm and each having one to four magnetic poles on one side thereof. FIG. 5 depicts a relationship between the repulsive force and the distance between two identical magnets when like magnetic poles are opposed to each other.

As can be seen from the graph of FIG. 5, the two-pole magnets can be effectively utilized to form a magnetic circuit that is efficient as a magneto-spring in a magnetic suspension unit. In the two-pole magnets, a leakage magnetic field is created between the neighboring magnets corresponding to magnetic domain walls, and when the faced magnets are brought near, a stronger repulsive force is obtained, reducing a sensation of bottoming or a bottom-end shock.

Figure 6:
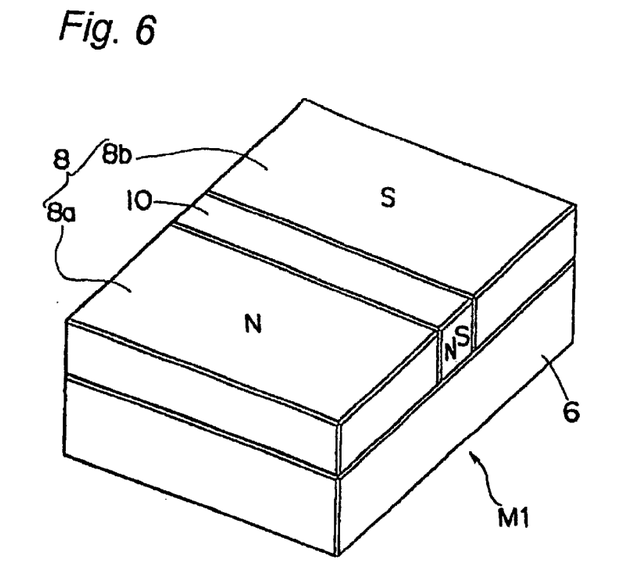
FIG. 6 is a perspective view of a magnetic circuit according to the present invention.

FIG. 6 depicts a magnetic circuit M1 embodying the present invention, which includes a generally rectangular yoke 6, a separated two-pole magnet 8 mounted on the yoke 6, and a single-pole magnet 10 interposed between separated pieces of the two-pole magnet. The separated two-pole magnet can be regarded as two single-pole magnets having different magnetic poles formed on the same side.

More specifically, each piece (magnet) 8a, 8b of the separated two-pole magnet 8 (or each of the two single-pole magnets 8a, 8b) has magnetic poles formed in a direction perpendicular to a predetermined surface (upper surface in FIG. 6) of the yoke 6, and the two magnets 8a, 8b are spaced a pre determined distance with the single-pole magnet 10 interposed therebetween. On end surfaces (upper surfaces in FIG. 6) of the magnets 8a 8b remote from the yoke 6, the magnets 8a, 8b adjoin the magnet 10 with like magnetic poles oppose d to each other.

Figure 7:
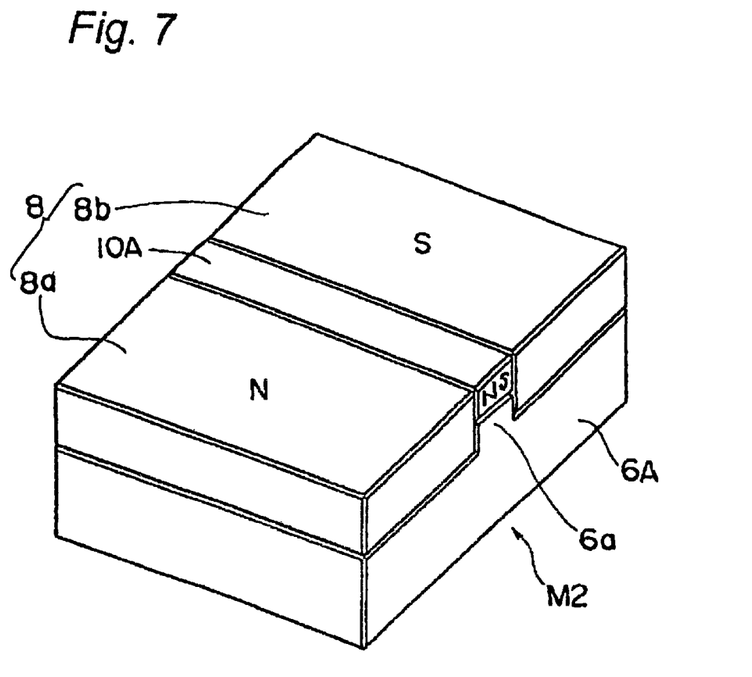
FIG. 7 is a view similar to FIG. 6, but depicting a modification thereof

FIG. 7 depicts a modified form M2 of the magnetic circuit M1. As shown therein, the magnetic circuit M2 includes a yoke 6A having an elongated protrusion 6a integrally formed therewith at the center of one end surface thereof and also having two shoulder portions formed on respective sides of the elongated protrusion 6a. This magnetic circuit M2 also includes a single-pole magnet 10A mounted on the elongated protrusion 6a and two separated magnets 8a, 8b (two separated pieces of the two-pole magnet 8) mounted on the shoulder portions of the yoke 6A, respectively.

Figure 8:
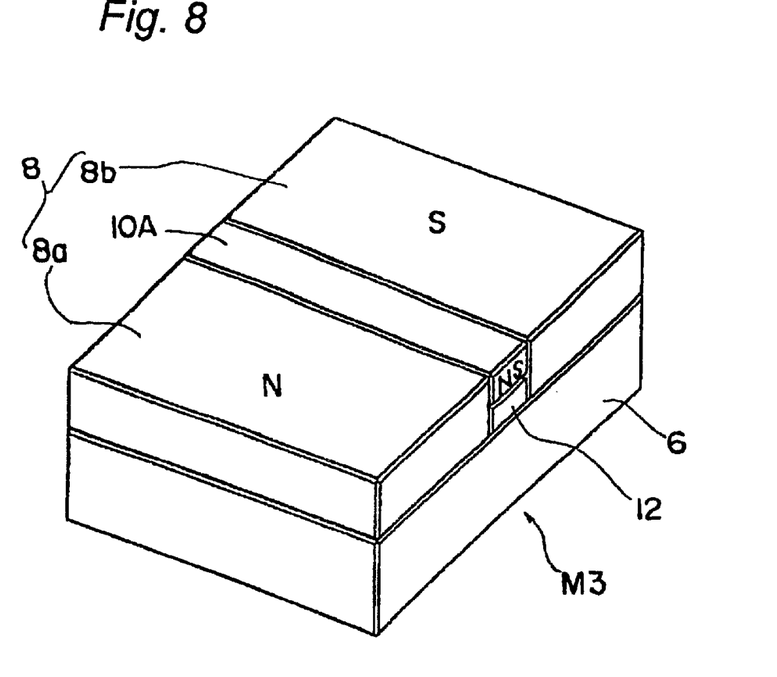
FIG. 8 is a view similar to FIG. 6, but depicting another modification thereof.

FIG. 8 depicts another modified form M3 of the magnetic circuit M1. As shown therein, the magnetic circuit M3 includes a spacer 12 made of aluminum, copper or the like placed at the position where the elongated protrusion 6a is formed in the magnetic circuit M2. Accordingly, the yoke 6 shown in FIG. 8 is identical to the yoke 6 shown in FIG. 6.

Figure 9A:
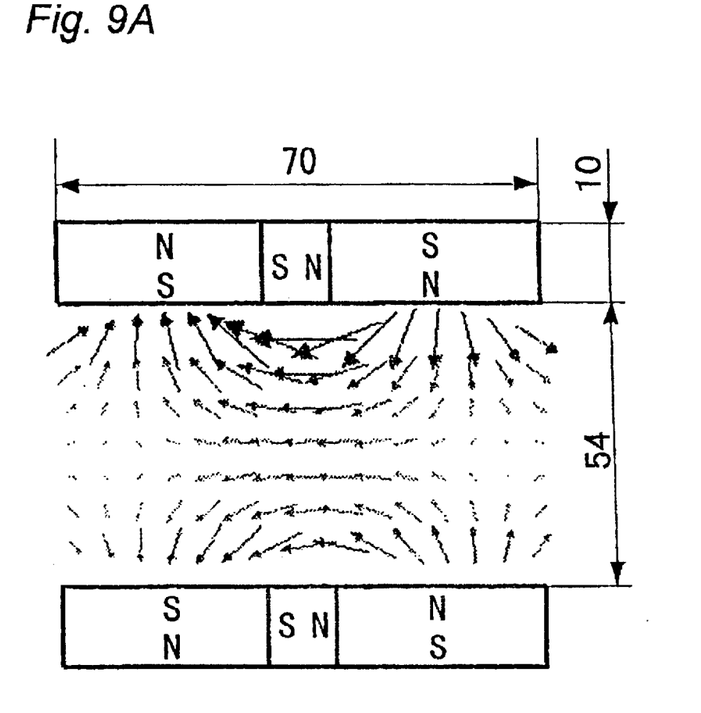
FIG. 9A is a schematic view indicative of the magnetic flux distribution of a magneto-spring constituted by the magnetic circuit of FIG. 6.
Figure 9B:
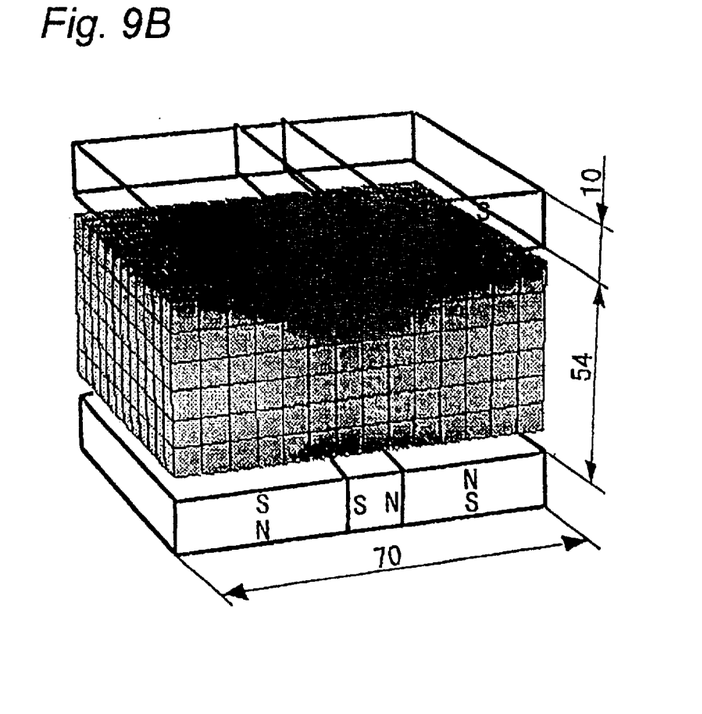
FIG. 9B is a schematic view indicative of the gradation of the magnetic flux distribution of FIG. 9A.

FIGS. 9A and 9B depict a magnetic flux distribution when a magneto-spring has been formed by two magnetic circuits of FIG. 6 that have a size (opposing area) of 70×70 mm² and are spaced from each other with like magnetic poles opposed to each other.

Figure 10A:
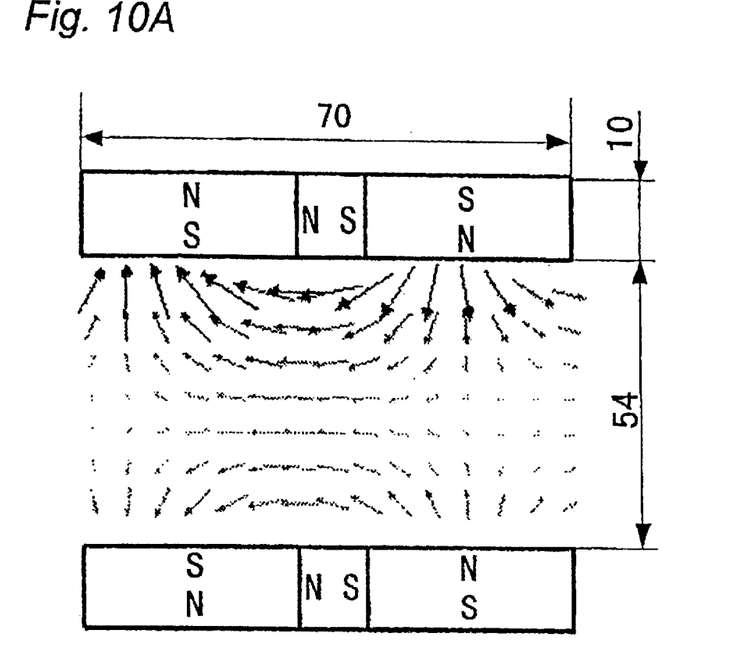
FIG. 10A is a schematic view indicative of the magnetic flux distribution of the magneto-spring of FIG. 9A when magnetic poles of a single-pole magnet located at the center thereof have been reversely arranged.
Figure 10B:
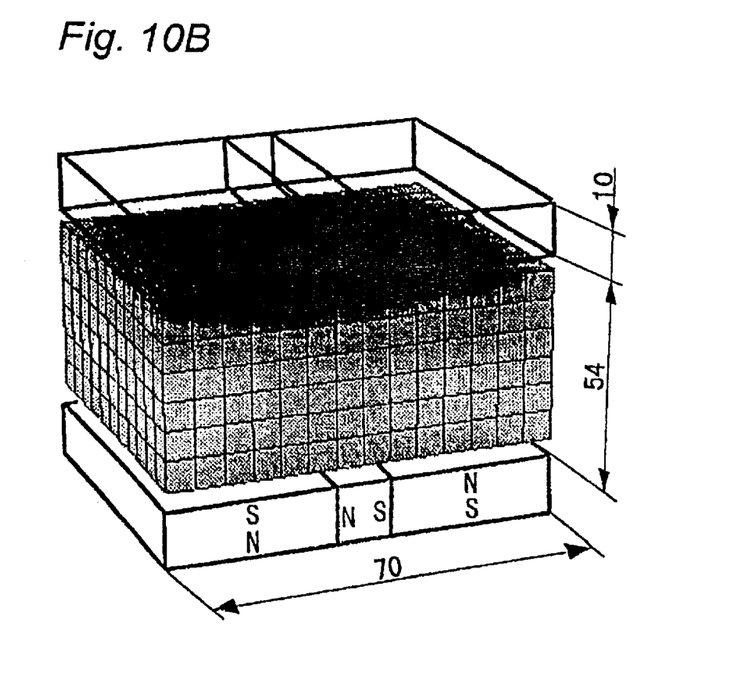
FIG. 10B is a schematic view indicative of the gradation of the magnetic flux distribution of FIG. 10A.
Figure 11A:
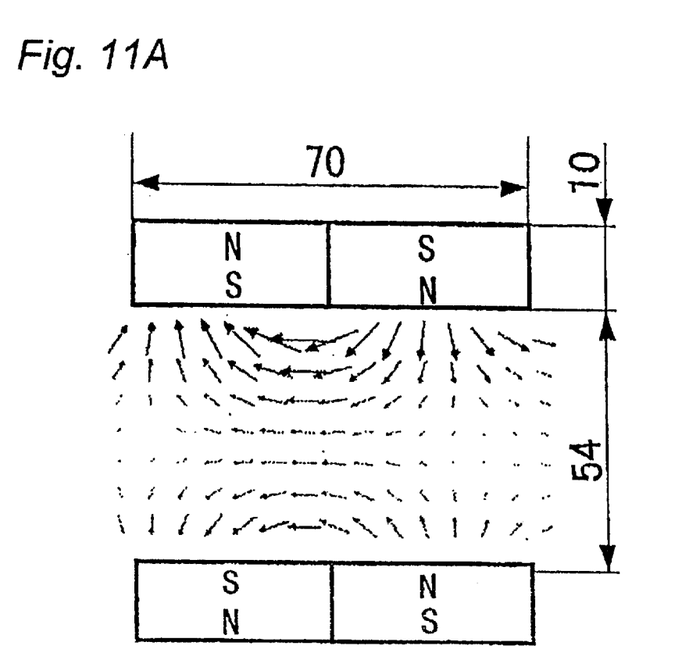
FIG. 11A is a schematic view indicative of the magnetic flux distribution of a magneto-spring constituted by magnetic circuits that are each made up of only a two-pole magnet.
Figure 11B:
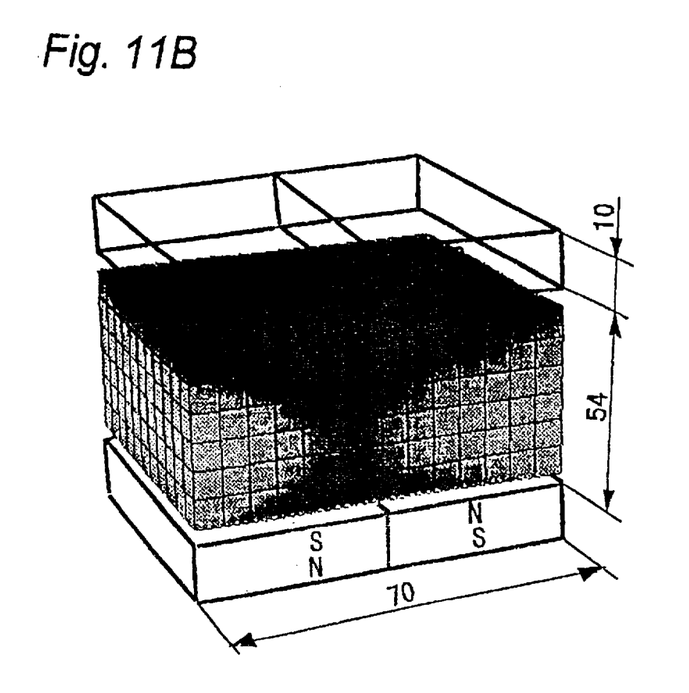
FIG. 11B is a schematic view indicative of the gradation of the magnetic flux distribution of FIG. 11A.

FIGS. 10A and 10B depict a magnetic flux distribution when the magnetic poles of the magnet 10 interposed between the magnets 8a, 8b have been reversely arranged in the magnetic circuit of FIG. 6. As shown in FIGS. 10A and 10B, the magnets 8a, 8b and the magnet 10 are arranged such that the magnetic poles thereof attract each other on the opposing side of the two magnetic circuits.

As can be seen from the magnetic flux distribution of FIGS. 9A and 9B and that of FIGS. 10A and 10B, if the separated two-pole magnet 8 and the magnet 10 disposed at the center thereof are arranged such that like magnetic poles are opposed to each other on the opposing side of the two magnetic circuits, the magnetic flux advancing from the magnet 8a towards the magnet 8b is controlled by the magnetic flux of the magnet 10, making it possible to increase the repulsive force.

Figure 4A:
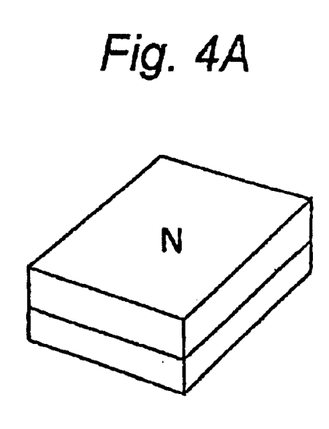
FIG. 4A is a perspective view of a single-pole permanent magnet.
Figure 4B:
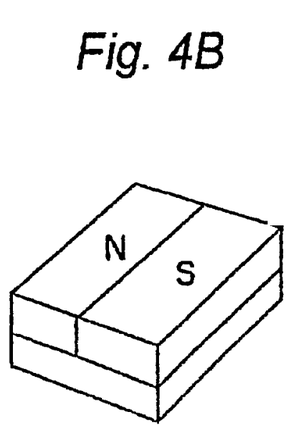
FIG. 4B is a view similar to FIG. 4A, but depicting a two-pole permanent magnet.
Figure 4C:
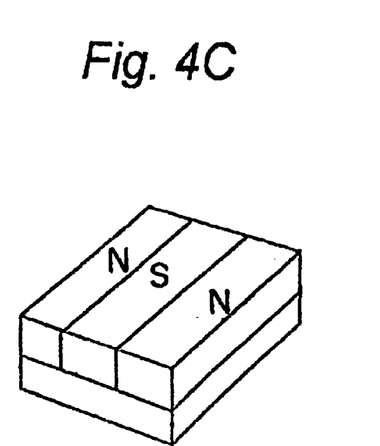
FIG. 4C is a view similar to FIG. 4A, but depicting a three-pole permanent magnet.
Figure 4D:
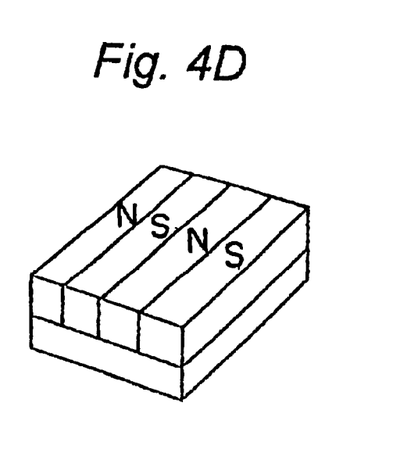
FIG. 4D is a view similar to FIG. 4A, but depicting a four-pole permanent magnet with magnetic poles positioned in a side-by-side fashion.
Figure 4E:
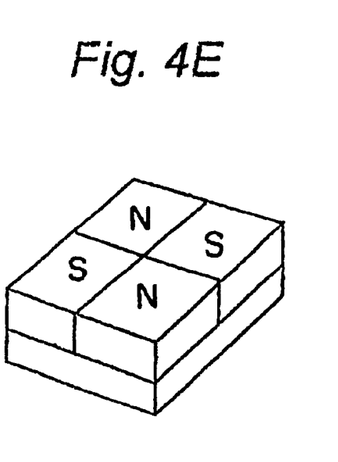
FIG. 4E is a view similar to FIG. 4A, but depicting another four-pole permanent magnet with magnetic poles positioned at 90° intervals.
Figure 5:
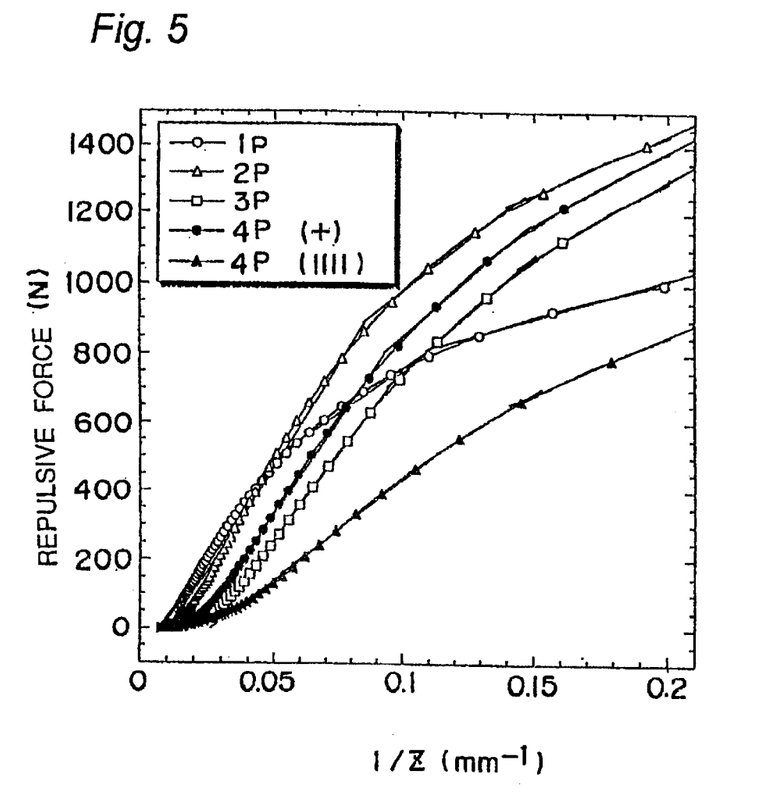
FIG. 5 is a graph depicting a relationship between the distance between the two opposing magnets and the repulsive force thereof when the magnets shown in FIGS. 4A to 4E have an opposing area of 75×75 $mm^2$ and a thickness of 20 mm, and like magnetic poles are opposed to each other.

FIGS. 11A and 11B and FIGS. 12A and 12B depict magnetic flux distributions when the two-pole magnet shown in FIG. 4B has a size of 70×70 mm² and a size of 75×75 mm², respectively. In the case where the magnet arrangement in the magnetic circuit is the same, the repulsive force becomes larger as the size of the magnetic circuit increases. However, even if the size of the magnetic circuit is the same, the magnetic flux distribution can be controlled by changing the magnet arrangement, resulting in a magnetic circuit having a high repulsive force.

Figure 12A:
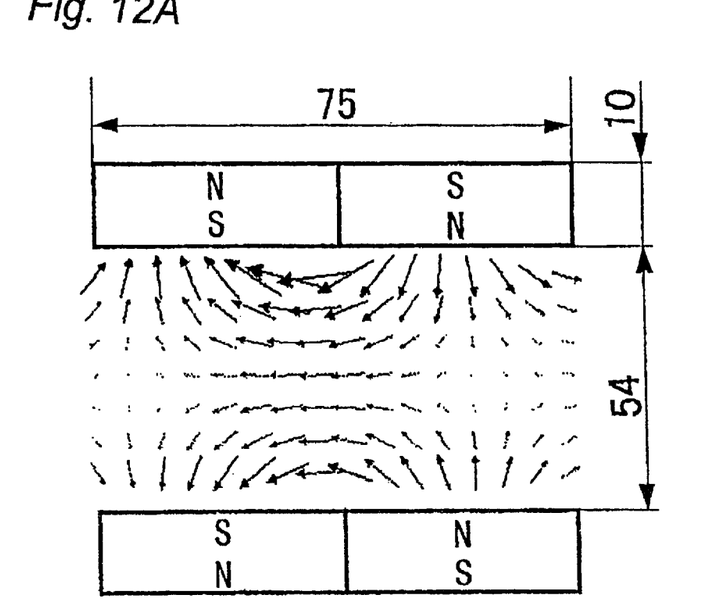
FIG. 12A is a schematic view indicative of the magnetic flux distribution of the magneto-spring of FIG. 11A when the size of the magnetic circuits has been enlarged.
Figure 12B:
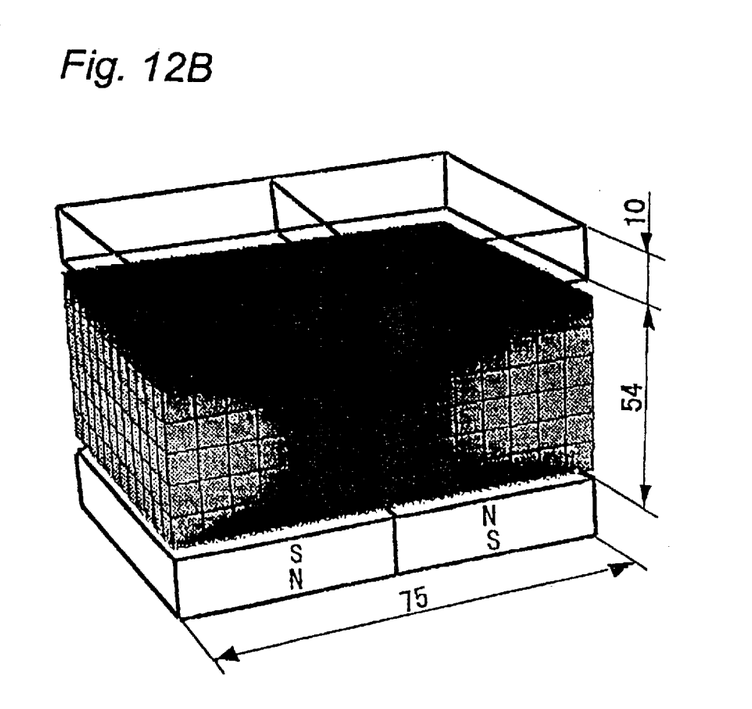
FIG. 12B is a schematic view indicative of the gradation of the magnetic flux distribution of FIG. 12A.
Figure 13A:
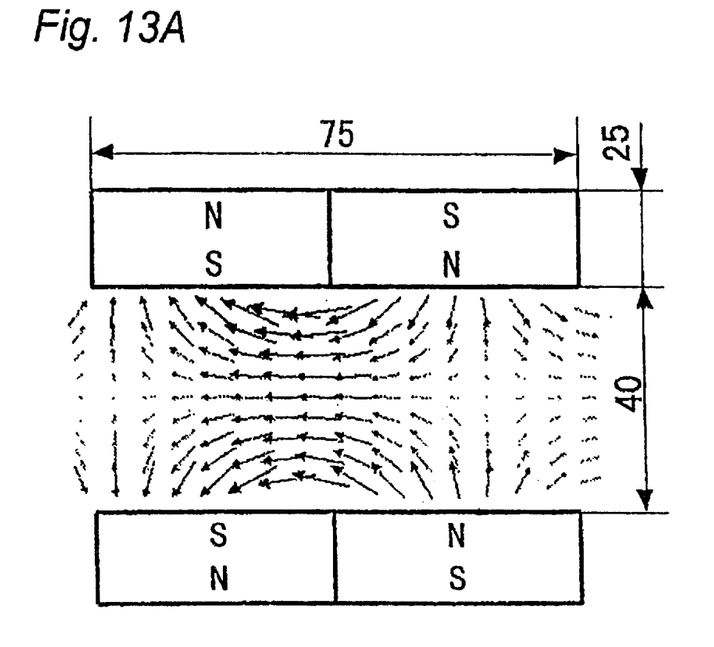
FIG. 13A is a schematic view indicative of the magnetic flux distribution of the magneto-spring of FIG. 11A when the size of the magnetic circuits has been further enlarged and the distance therebetween has been reduced.
Figure 13B:
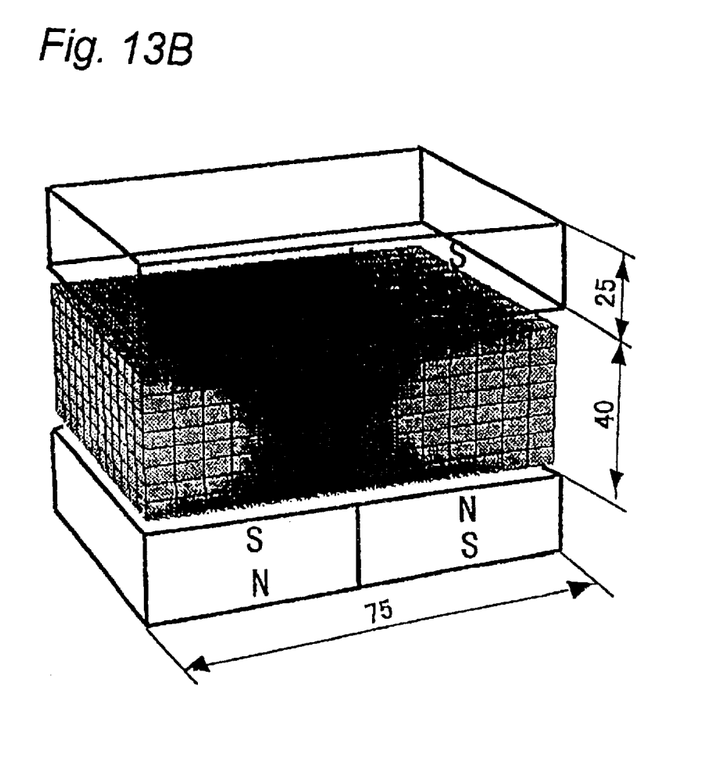
FIG. 13B is a schematic view indicative of the gradation of the magnetic flux distribution of FIG. 13A.

FIGS. 13A and 13B depict a magnetic flux distribution of a magneto-spring similar to the magneto-spring of FIGS. 12A and 12B. The magneto-spring of FIGS. 13A and 13B, however, has magnets of an increased thickness that constitute two opposing magnetic circuits, and also has a reduced distance between the magnets.

Figure 14A:
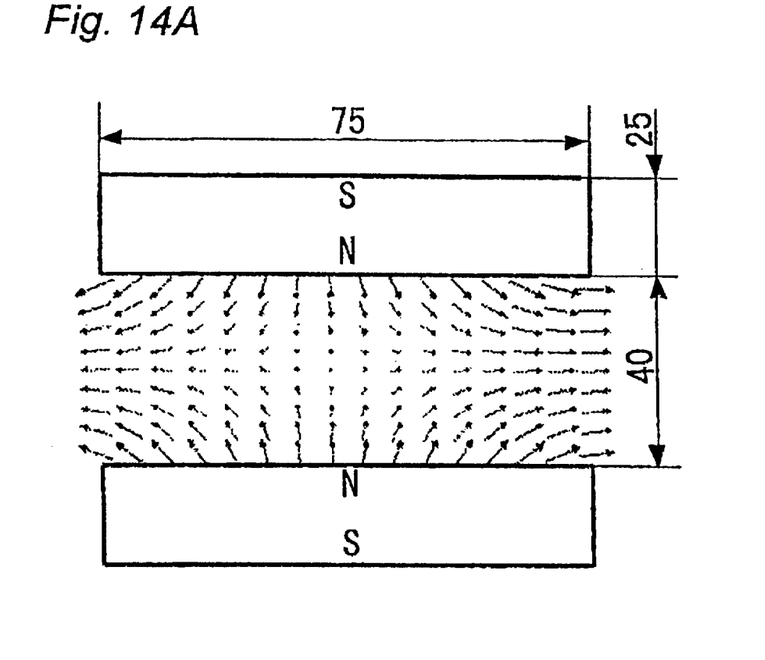
FIG. 14A is a schematic view indicative of the magnetic flux distribution of a magneto-spring constituted by magnetic circuits that are each made up of only a single-pole magnet.
Figure 14B:
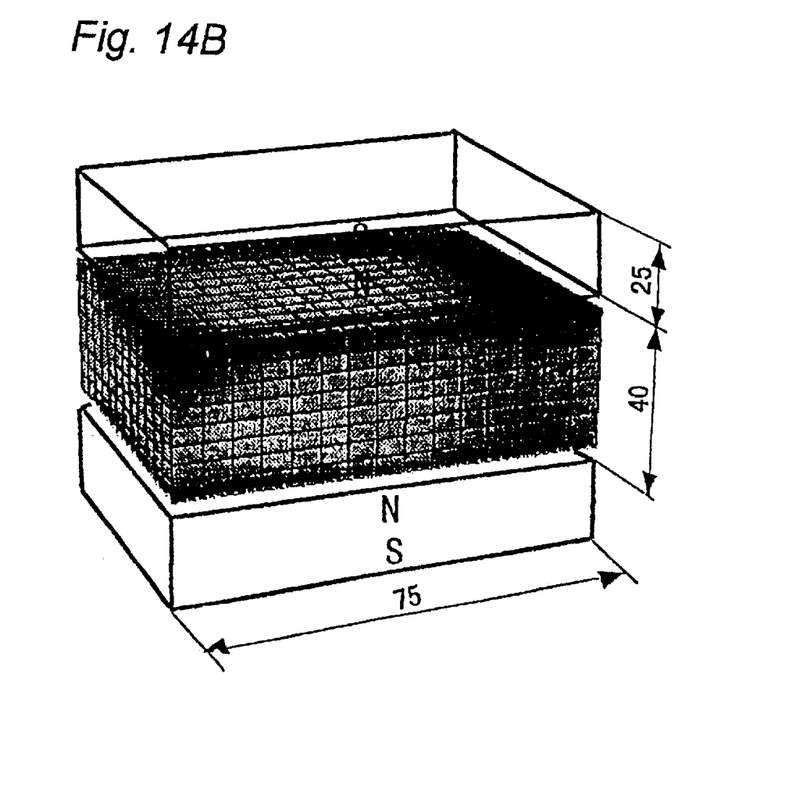
FIG. 14B is a schematic view indicative of the gradation of the magnetic flux distribution of FIG. 11A.

FIGS. 14A and 14B depict a magnetic flux distribution when the two-pole magnets in the magneto-spring of FIGS. 13A and 13B have been replaced by single-pole magnets.

As can be seen from FIGS. 13A and 13B and FIGS. 14A and 14B, the repulsive force becomes larger as the size of the magnetic circuits becomes larger or as the distance between the magnetic circuits becomes smaller. Furthermore, the repulsive force can be increased by using the two-pole magnets in place of the single-pole magnets.

Figure 15:
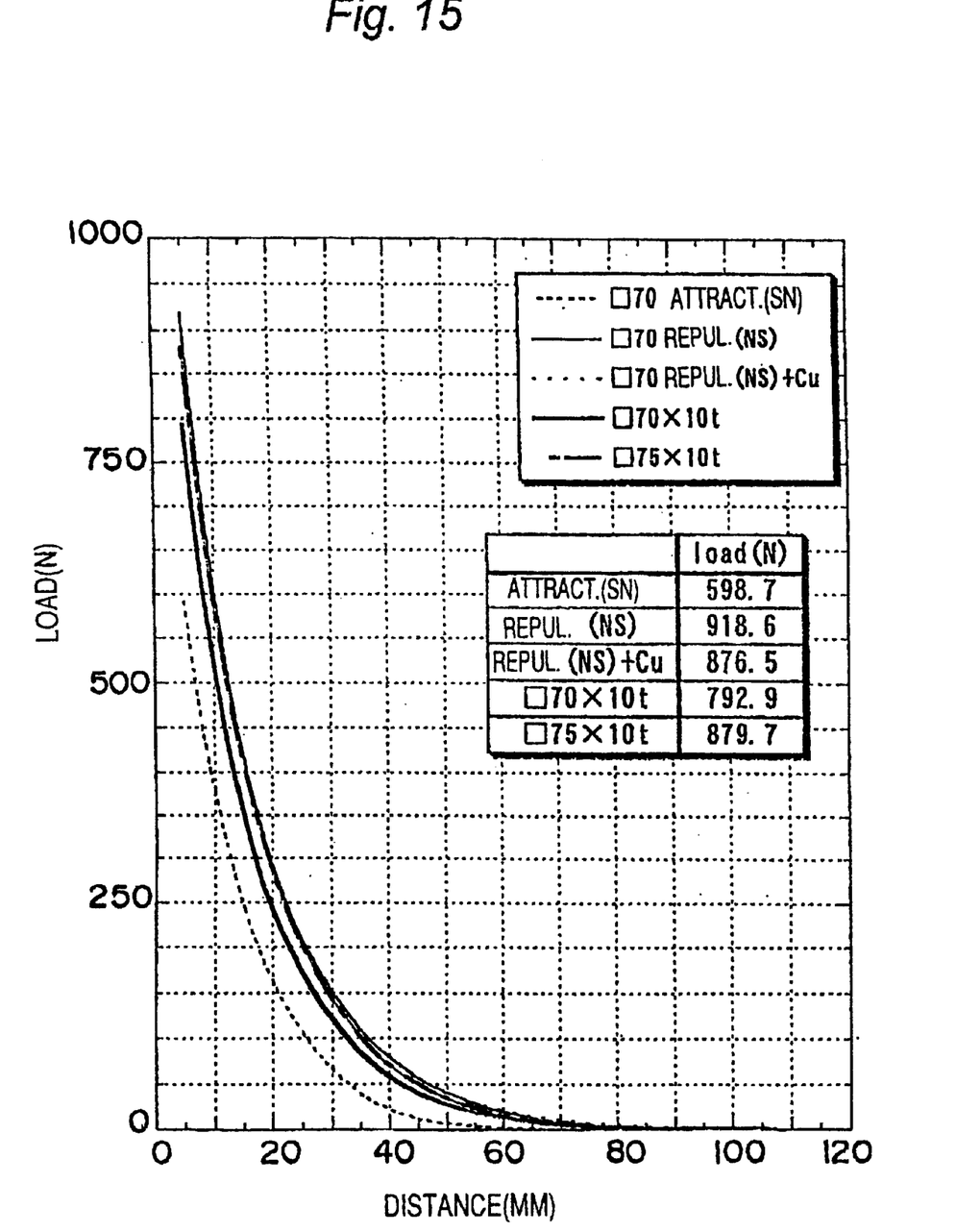
FIG. 15 is a graph indicating a relationship between the load and the distance between the magnets in various magneto-springs.
Figure 16:
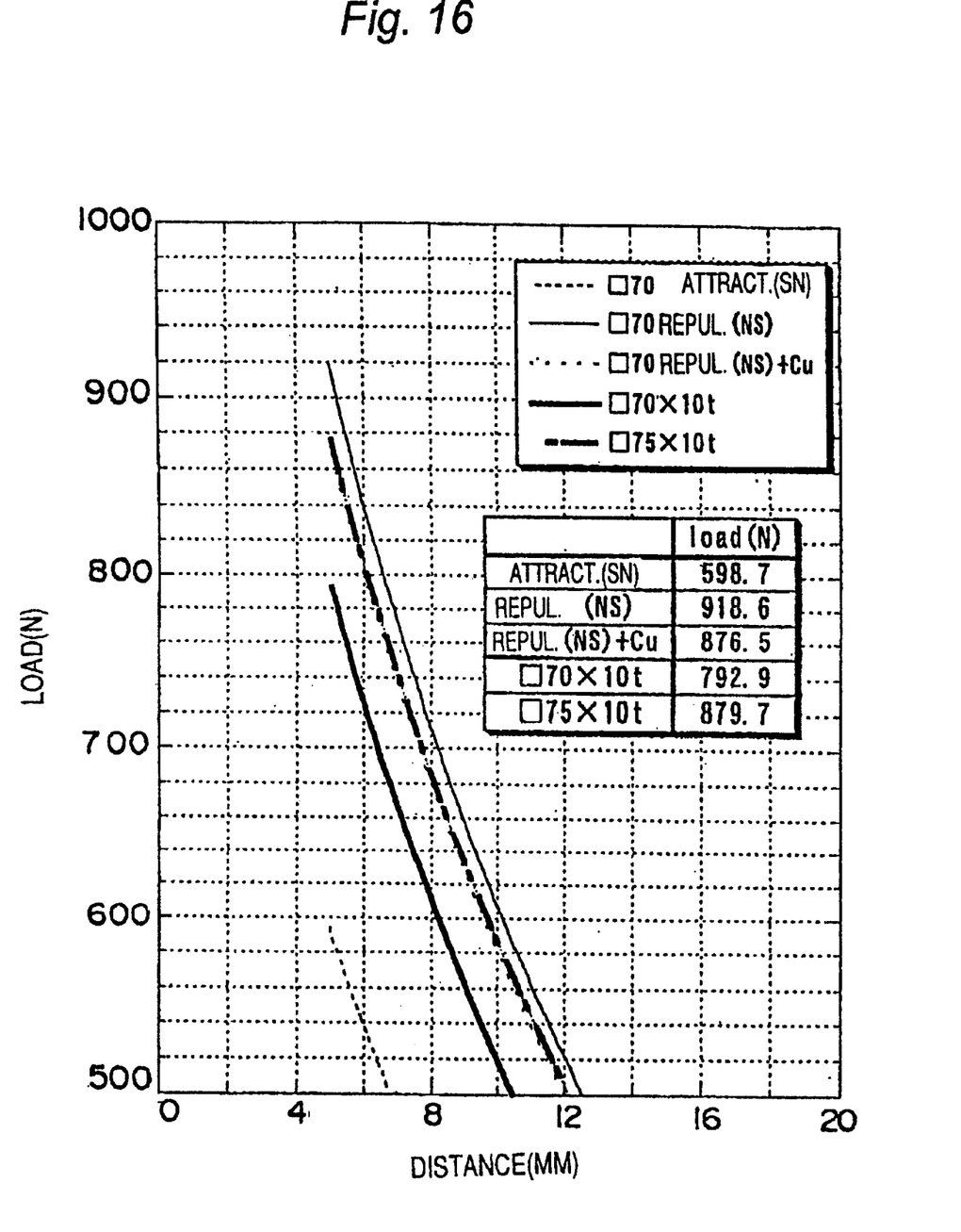
FIG. 16 is a partially enlarged graph of FIG. 15.

FIGS. 15 and 16 depict a relationship between the load (repulsive force) and the distance between the magnetic circuits in various magneto-springs. In these figures, ATTRAC (SN), REPUL (NS), and REPUL (NS+Cu) denote the magnetic circuits of FIGS. 10A and 10B, those of FIGS. 9A and 9B, and those having copper spacers in the arrangement of FIGS. 9A and 9B (see FIG. 8), respectively. Also, in these figures, □70×10 t and □75×10 t denote the arrangement of FIGS. 11A and 11B in which each magnetic circuit is made up of a two-pole magnet and the arrangement of FIGS. 12A and 12B in which each magnetic circuit is similarly made up of a two-pole magnet, respectively.

The graphs of FIGS. 15 and 16 reveal that where the size of the magnetic circuits is the same, the repulsive force can be increased by the use of the magnetic circuits of FIGS. 6 to 8 according to the present invention.

Although the two-pole magnet is employed in the magnetic circuits of FIGS. 6 to 8, a multi-pole magnet such as a three-pole magnet or a four-pole magnet can be also employed. That is, the repulsive force can be increased by inserting a repulsive magnet into separated pieces of the multi-pole magnet.

More specifically, where a magnetic circuit includes a multi-pole magnet, a leakage magnetic field is created between neighboring magnets, and the repulsive force is increased by utilizing a magnetic field gradient at this time. Furthermore, when a repulsive magnet is inserted into separated pieces of the multi-pole magnet, the magnetic field gradient changes, thereby further increasing the repulsive force.

In the presence of the magnetic field gradient, a force caused thereby is given by:

$$F=M(\partial H/\partial x) \qquad (23)$$

where M denotes a magnetic moment and $\partial H/\partial x$ denotes a magnetic field gradient. When the magnetic flux is controlled by utilizing the leakage magnetic field created between the neighboring magnet pieces of the multi-pole magnet, the magnetic field gradient is caused to have a directivity, making it possible to increase the repulsive force.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A magnetic circuit comprising:

a yoke having a face;

a multi-pole magnet mounted on said face of said yoke and separated into a first piece and a second piece, said first piece having a first magnetic pole of a first polarity on a face of said first piece remote from said yoke and said second piece having a second magnetic pole of a second polarity on a face of said second piece remote from said yoke; and a single-pole magnet interposed between said first piece and said second piece of said multi-pole magnet, said single-pole magnet having a third magnetic pole of one of the first polarity and the second polarity on a first face of said single-pole magnet adjacent to said first piece of said multi-pole magnet and a fourth magnetic pole of one of the first polarity and the second polarity, said fourth magnetic pole having a different polarity than said third magnetic pole, on a second face of said single-pole magnet adjacent to said second piece of said multi-pole magnet, wherein said face of said first piece of said multi-pole magnet and said face of said second piece of said multi-pole magnet extend in a direction generally perpendicular to a direction in which said first face of said single-pole magnet and said second face of said single-pole magnet extend.

2. A magnetic circuit according to claim 1, wherein said yoke has a projection formed on said face of said yoke and said single-pole magnet is located on said projection, and wherein said first piece of said multi-pole magnet and said second piece of said multi-pole magnet are located on opposite sides of said projection and said single-pole magnet.

3. A magnetic circuit according to claim 1, further comprising a spacer mounted on said face of said yoke, wherein said single-pole magnet is located on said spacer, wherein said first piece of said multi-pole magnet and said second piece of said multi-pole magnet are located on opposite sides of said spacer and said single-pole magnet.

4. A magnetic circuit according to claim 1, wherein said third magnetic pole of said single-pole magnet has the first polarity and said fourth magnetic pole of single-pole magnet has the second polarity.

5. A magnetic circuit according to claim 1, wherein said multi-pole magnet comprises a two-pole magnet.

* * * * *